(12) United States Patent
Indesteege et al.

(10) Patent No.: US 7,820,749 B2
(45) Date of Patent: Oct. 26, 2010

(54) CURABLE RESIN COMPOSITION

(75) Inventors: Johan Indesteege, Mol (BE); Guido Van Sande, Turnhout (BE)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 12/297,815

(22) PCT Filed: Apr. 18, 2007

(86) PCT No.: PCT/JP2007/058470

§ 371 (c)(1),
(2), (4) Date: Oct. 20, 2008

(87) PCT Pub. No.: WO2007/119867

PCT Pub. Date: Oct. 25, 2007

(65) Prior Publication Data

US 2009/0170995 A1   Jul. 2, 2009

(30) Foreign Application Priority Data

Apr. 19, 2006   (JP)  ............... 2006-115327

(51) Int. Cl.
*C08K 3/26*   (2006.01)
*C09D 17/00*   (2006.01)
*C08G 77/04*   (2006.01)
*C08G 65/04*   (2006.01)

(52) U.S. Cl. .................. 524/425; 524/914; 528/25; 528/421

(58) Field of Classification Search .................. 524/425
See application file for complete search history.

(56) References Cited

U.S. PATENT DOCUMENTS 5,703,146 A * 12/1997 Iwakiri et al. ................ 523/200
2002/0198352 A1* 12/2002 Tanaka et al. ................. 528/10

FOREIGN PATENT DOCUMENTS

| JP | 6-128548 | A |   | 5/1994 |
| JP | 8-3365 | A |   | 1/1996 |
| JP | 08003365 | A | * | 1/1996 |
| JP | 8-41361 | A |   | 2/1996 |
| JP | 10-330630 | A |   | 12/1998 |
| JP | 2003-105956 | A |   | 4/2003 |
| JP | 2004-91771 | A |   | 3/2004 |
| JP | 2005-171217 | A |   | 6/2005 |
| JP | 2006-348178 | A |   | 12/2006 |
| JP | 2006348178 |   | * | 12/2006 |

OTHER PUBLICATIONS

Notification of Transmittal of Copies of Translation of the International Preliminary Report on Patentability (Form PCT/IB/338) of International Application No. PCT/JP2007/058470 mailed Nov. 27, 2008 with Forms PCT/IB/373 and PCT/ISA/237.
International Search Report of PCT/JP2007/058470, date of mailing Jun. 12, 2007.

* cited by examiner

*Primary Examiner*—Vasu Jagannathan
*Assistant Examiner*—Anthony H Sheh
(74) *Attorney, Agent, or Firm*—Westerman, Hattori, Daniels & Adrian, LLP

(57) ABSTRACT

It is an object of the present invention to provide a curable resin composition, having excellent workability (thixotropic properties and applicability) required in applications such as floor adhesives, without causing a decrease in mechanical properties, which contains an organic polymer having a reactive silicon group. The object is attained by a curable resin composition including: an organic polymer (A) having a reactive silicon group; a filler (B) obtained through a combination of three types of filler, namely a filler (B1) having an average particle diameter of less than 0.5 μm, a filler (B2) having an average particle diameter of not less than 0.5 μm to less than 10 μm, and a filler (B3) having an average particle diameter of not less than 10 μm.

3 Claims, No Drawings

CURABLE RESIN COMPOSITION

TECHNICAL FIELD

The present invention relates to a curable resin composition, having excellent workability required in applications such as floor adhesives, which contains an organic polymer having a reactive silicon group.

BACKGROUND ART

In recent years, for the purpose of measures against problems such as sick building syndrome, solvent-free adhesives have been preferred as interior adhesives such as floor adhesives. Among them, an adhesive prepared with an organic polymer having a reactive silicon group or, in particular, a polyoxyalkylene-based polymer having a reactive silicon group has excellent workability and satisfactory curability, and therefore has been used as a solvent-free floor adhesive or, in particular, as a solvent-free wooden-floor adhesive.

However, in comparison with conventional solvent-based adhesives, the solvent-free adhesives have higher viscosity in general, thus causing a problem of deterioration in applicability, especially when used as floor adhesives to be applied to wide areas. In order to solve the problem, an ingenious attempt has been made to reduce viscosity with use of a filler having a large particle diameter. However, such an attempt causes an adhesive to drip when scooped up with a trowel, thus causing a problem of deterioration in workability.

It has been reported that an adhesive having thixotropic properties obtained by adding approximately 100 parts by weight of colloidal calcium carbonate to a polyoxyalkylene-based polymer having a reactive silicon group is effective as means to solve these problems (e.g., see Patent Documents 1 and 2). However, unfortunately, these adhesives are not only insufficient in applicability when applied to wide areas, but also too expensive for such applications.

Patent Document 1: Japanese Unexamined Patent Application Publication No. 105956/2003 (Tokukai 2003-105956)
Patent Document 2: Japanese Unexamined Patent Application Publication No. 171217/2005 (Tokukai 2005-171217)

DISCLOSURE OF THE INVENTION

Problems to be Solved by the Invention

It is an object of the present invention to provide a curable resin composition, having excellent workability required in applications such as floor adhesives, which contains an organic polymer having a reactive silicon group.

Means to Solve the Problems

As a result of diligent study to solve the foregoing problems, the inventors have come up with the present invention by combining, with an organic polymer having a reactive silicon group, three types of filler each having a specific particle diameter.

That is, the present invention relates to:

(1) A curable resin composition including: an organic polymer (A) having at least one reactive silicon group per molecule; a filler (B) simultaneously containing a filler (B1) having an average particle diameter of less than 0.5 μm, a filler (B2) having an average particle diameter of not less than 0.5 μm to less than 10 μm, and a filler (B3) having an average particle diameter of not less than 10 μm.

(2) The curable resin composition as set forth in (1), wherein a polymer main chain of the organic polymer (A) is a polyoxypropylene-based polymer.

(3) The curable resin composition as set forth in (1) or (2), having a viscosity of not less than 1000 Pa·s at a speed of rotation of 0.1 rev/sec and a viscosity of not more than 100 Pa·s at a speed of rotation of 10 rev/sec.

(4) The curable resin composition as set forth in any one of (1) to (3), wherein the fillers (B1), (B2), and (B3) constituting the filler (B) are contained in amounts of not less than 25 to not more than 100 parts by weight, not less than 50 to not more than 200 parts by weight, and not less than 25 to not more than 150 parts by weight, with respect to 100 parts by weight of the organic polymer (A), respectively.

(5) The curable resin composition as set forth in any one of (1) to (4), wherein the filler (B) is an inorganic filler.

(6) The curable resin composition as set forth in any one of (1) to (5), wherein the filler (B) is calcium carbonate.

(7) The curable resin composition as set forth in any one of (1) to (6), containing no organic thixotropic agent.

(8) The curable resin composition as set forth in any one of claims 1 to 7, being used as a wooden-floor adhesive.

Effects of the Invention

A curable resin composition of the present invention has excellent workability required in applications such as floor adhesives, without causing a decrease in mechanical properties. That is, the curable resin composition of the present invention can be easily applied to floor materials without the resin's dripping when scooped up in moderate quantities with a trowel for use in applying floor adhesives.

BEST MODE FOR CARRYING OUT THE INVENTION

Examples of the main-chain skeleton of the organic polymer (A) for use in the present invention having at least one reactive silicon group per molecule include a polyoxyalkylene-based polymer, an acrylic polymer, a polyisobutylene-based polymer, a polyester-based polymer, and a polycarbonate-based polymer.

Among these polymers, it is preferable, from a point of view of ready availability of a flexible hardened material, that the main-chain skeleton be a polyoxyalkylene-based polymer and/or an acrylic polymer or, in particular, a polyoxyalkylene-based polymer.

The main-chain skeleton of the polyoxyalkylene-based polymer essentially has a repeating unit represented by general formula (1):

where $R^1$ is a bivalent organic group, i.e., a C1-C14 straight-chain or branched alkylene group.

It is preferable that $R^1$ in general formula (1) be a C2-C4 straight-chain or branched alkylene group.

Specific examples of the repeating unit represented by general formula (1) are as follows:

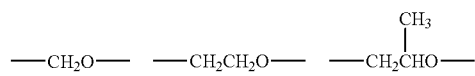

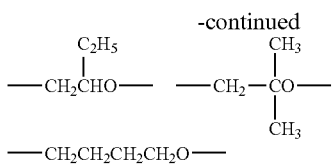

The main-chain skeleton of the polyoxyalkylene-based polymer may be constituted by one type of repeating unit, or may be constituted by two or more types of repeating unit. In particular, in case of use as a sealant, an adhesive, or the like, it is preferable that the polymer be composed mainly of oxypropylene.

Examples of a method for synthesizing a polyoxyalkylene-based polymer include, but are not particularly limited to, a polymerization method that involves the use of an alkali catalyst such as KOH. Examples of the polymerization method include, but are not particularly limited to: a polymerization method, disclosed in Japanese Unexamined Patent Application Publication No. 215623/1986 (Tokukai-sho 61-215623), which involves the use of a transition metal compound-porphyrin complex catalyst such as a complex that is obtained through a reaction between an organic aluminum compound and porphyrin; and a polymerization method, disclosed in Japanese Examined Patent Application Publication No. 27250/1971 (Tokukosho 46-27250) and Japanese Examined Patent Application Publication No. 15336/1984 (Tokukosho 59-15336), that involves the use of a double metal cyanide complex catalyst.

The main-chain skeleton of the polyoxyalkylene-based polymer may contain other components inclusive of a urethane bond and the like unless the properties of the polyoxyalkylene-based polymer are not impaired.

Examples of the other components inclusive of a urethane bond and the like include, but are not limited to, a product of a reaction between aromatic polyisocyanate (such as toluene (tolylene)diisocyanate, diphenylmethane diisocyanate, or xylylene diisocyanate) or aliphatic polyisocyanate (such as isophorone diisocyanate or hexamethylene diisocyanate) and a polyoxyalkylene-based polymer having a repeating unit represented by general formula (1).

A reactive silicon group contained in the organic polymer (A) having at least one reactive silicon group per molecule is a group, having a hydroxyl group or a hydrolyzable group bonded to a silicon atom, which can be cross-linked by forming a siloxane bond. Examples of the reactive silicon group include a group represented by general formula (2):

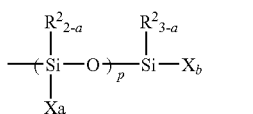

(2)

where $R^2$ and $R^3$ are each independently a C1-C20 alkyl group, a C6-C20 aryl group, a C7-C20 aralkyl group, or a triorganosiloxy group represented by $R^4{}_3SiO-$ (where the three $R^4$s are each independently a C1-C20 monovalent hydrocarbon group); X is a hydroxyl group or a hydrolyzable group; a is an integer of 0 to 2, b is an integer of 0 to 3, and p is an integer of 0 to 19. It should be noted that: when there exist two or more $R^2$s or $R^3$s, they may be identical or different; and when there exist two or more X's, they may be identical or different. Further, the p a's may be identical or different in general formula (3):

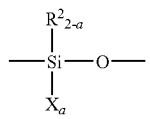

(3)

where (sum of a's)+b≧1 is satisfied.

The hydrolyzable group represented by X is not particularly limited as long as it is a conventionally publicly-known hydrolyzable group. Specific examples are a hydrogen atom, a halogen atom, an alkoxy group, an acyloxy group, a ketoxymate group, an amino group, an amide group, an acid amide group, an aminooxy group, a mercapto group, and an alkenyloxy group. Among these, a hydrogen atom, an alkoxy group, an acyloxy group, a ketoxymate group, an amino group, an amide group, an aminooxy group, a mercapto group, and an alkenyloxy group are preferred. From a point of view of moderation in hydrolytic properties and ease of handling, an alkoxy group is preferred in particular.

The number of such hydrolyzable groups or hydroxyl groups that can be bonded to one silicon atom falls within a range of 1 to 3. It is preferable that the (sum of a's)+b fall within a range of 1 to 5. In cases where there are two or more hydrolyzable groups or hydroxyl groups bonded to a reactive silicon group, they may be identical or different.

The number of silicon atoms that forms the reactive silicon group may be 1, or may be 2 or more. However, in the case of silicon atoms linked via a siloxane bond or the like, the number of silicon atoms may be approximately 20.

Preferred from a point of view of ready availability among reactive silicon groups represented by general formula (2) is a group represented by general formula (4):

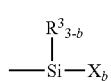

(4)

where $R^3$, X, and b are the same as above.

Further, specific examples of $R^2$ in general formula (3) and $R^3$ in general formula (4) include: an alkyl group such as a methyl group or an ethyl group; a cycloalkyl group such as a cyclohexyl group; an aryl group such as a phenyl group; an aralkyl group such as a benzyl group; and a triorganosiloxy group represented by $R^4{}_3SiO-$ whose $R^4$ is a methyl group or a phenyl group. Among these, a methyl group is preferred.

Furthermore, especially preferred specific examples of the structure of a reactive silicon group include a trimethoxysilyl group, a methyldimethoxysilyl group, a triethoxysilyl group, and a methyldiethoxysilyl group. Further, it is possible to use one type of reactive silicon group, or to use two or more types of reactive silicon group in combination.

It is possible to use a publicly-known method to introduce a reactive silicon group into the organic polymer (A) having at least one reactive silicon group per molecule. That is, in cases where the main-chain skeleton is a polyoxyalkylene-based polymer, examples of the method are as follows:

First Method: A polyoxyalkylene-based polymer containing an unsaturated group is obtained through a reaction between a polyoxyalkylene-based polymer having a functional group such as a hydroxyl group in the molecule and an organic compound having an active group and an unsaturated group that are reactive to the functional group. Alternatively, an unsaturated group-containing polyoxyalkylene-based polymer is obtained through copolymerization with an unsaturated group-containing epoxy compound. The reaction product thus obtained is hydrosilylated by causing a hydrosilane having a reactive silicon group to act thereon.

Second Method: A polyoxyalkylene-based polymer containing an unsaturated group is obtained in the same manner as in the first method, and then is reacted with a compound having a mercapto group and a reactive silicon group.

Third Method: A polyoxyalkylene-based polymer having a functional group such as a hydroxyl group, an epoxy group, or an isocyanate group in the molecule is reacted with a compound having a functional group that is reactive to the functional group and a reactive silicon group.

Among the above methods, or among the first and third methods in particular, a method for causing a reaction between a polymer having a hydroxyl group at a terminal thereof and a compound having an isocyanate group and a reactive silicon group is preferred.

The organic polymer (A) having at least one reactive silicon group per molecule may be straight or branched, and the molecular weight thereof preferably falls within a range of approximately 500 to 50,000, or more preferably 1,000 to 30,000. The number of reactive silicon groups that are contained therein is at least 1, or preferably 1.1 to 5, in the molecule of the polymer. If the number of reactive silicon groups that are contained in the molecule is less than 1, there is insufficiency in curability. If the number is too large, too dense a network structure prevents exhibition of satisfactory mechanical properties.

Specific examples of the organic polymer (A) having at least one reactive silicon group per molecule include, but are not particularly limited to: those proposed in publications such as Japanese Examined Patent Application Publication No. 36319/1970 (Tokukosho 45-36319), Japanese Examined Patent Application Publication No. 12154/1971 (Tokukosho 46-12154), Japanese Unexamined Patent Application Publication No. 156599/1975 (Tokukaisho 50-156599), Japanese Unexamined Patent Application Publication No. 6096/1979 (Tokukaisho 54-6096), Japanese Unexamined Patent Application Publication No. 13767/1980 (Tokukaisho 55-13767), Japanese Unexamined Patent Application Publication No. 13468/1980 (Tokukaisho 55-13468), Japanese Unexamined Patent Application Publication No. 164123/1982 (Tokukaisho 57-164123), Japanese Examined Patent Application No. 2450/1991 (Tokukohei 3-2450), U.S. Pat. No. 3,632,557, U.S. Pat. No. 4,345,053, U.S. Pat. No. 4,366,307, and U.S. Pat. No. 4,960,844; and high-molecular-weight and narrow-molecular-weigh t-distribution polyoxyalkylene-based polymers having reactive silicon groups, proposed in Japanese Unexamined Patent Application Publication No. 197631/1986 (Tokukaisho 61-197631), Japanese Unexamined Patent Application Publication No. 215622/1986 (Tokukaisho 61-215622), Japanese Unexamined Patent Application Publication No. 215623/1986 (Tokukaisho 61-215623), and Japanese Unexamined Patent Application Publication No. 218632/1986 (Tokukaisho 61-218632), each of which has a number-average molecular weight of not less than 6,000 and a molecular weight distribution (Mw/Mn) of not more than 1.6.

The above polyoxyalkylene-based polymers having reactive silicon groups may be used alone or in combination of two or more.

Further, the above polyoxyalkylene-based polymers having reactive silicon groups can be used after being blended with a vinyl-based polymer having a reactive silicon group.

A method for blending a vinyl-based polymer having a reactive silicon group is proposed in Japanese Unexamined Patent Application Publication No. 122541/1984 (Tokukaisho 59-122541), Japanese Unexamined Patent Application Publication No. 112642/1988 (Tokukaisho 63-112642), Japanese Unexamined Patent Application Publication No. 172631/1994 (Tokukaihei 6-172631), and the like.

A preferred specific example is a method for production that involves the step of blending (i) a polyoxyalkylene-based polymer having a reactive silicon group with (ii) a copolymer, having a reactive silicon group, whose molecular chain is composed substantially of:

an acrylic ester monomer unit and/or a methacrylic ester monomer unit each having a C1-C8 alkyl group represented by general formula (5)

(5)

where $R^5$ is a hydrogen atom or a methyl group and $R^6$ is a C1-C8 alkyl group; and an acrylic ester monomer unit and/or a methacrylic ester monomer unit each having a C10 or more alkyl group represented by general formula (6)

(6)

where $R^5$ is the same as above and $R^7$ is a C10 or more alkyl group.

Examples of $R^6$ in general formula (5) include a C1-C8, preferably C1-C4, or more preferably C1-C2 alkyl group such as a methyl group, an ethyl group, a propyl group, an n-butyl group, a tert-butyl group, or a 2-ethylhexyl group. It should be noted that the alkyl group represented by $R^6$ may be used alone or in combination of two or more types thereof.

Examples of $R^7$ in general formula (6) include a C10 or more, normally C10-C30, or preferably C10-C20 long-chain alkyl group such as a lauryl group, a tridecyl group, a cetyl group, a stearyl group, or a behenyl group. It should be noted that, as with the case of $R^6$, the alkyl group represented by $R^7$ may be used alone or in combination of two or more types thereof.

The molecular chain of the vinyl-based copolymer is composed substantially of the monomer units respectively represented by general formulae (5) and (6). The term "substantially" here means that the total amount of the monomer units respectively represented by general formulae (5) and (6) that are contained in the copolymer exceeds 50% by weight. It is preferable that the total amount of the monomer units respectively represented by general formulae (5) and (6) be not less than 70% by weight.

Further, it is preferable that the abundance ratio by weight between the monomer unit represented by general formula (5) and the monomer unit represented by general formula (6) fall within a range of 95:5 to 40:60, or more preferably 90:10 to 60:40.

Examples of monomer units that may be contained in the copolymer in addition to those respectively represented by general formulae (5) and (6) include: acrylic acid such as acrylic acid and methacrylic acid; a monomer containing an amide group (e.g., acrylamide, methacrylamide, N-methylol acrylamide, or N-methylol methacrylamide), an epoxy group (e.g., glycidyl acrylate or glycidyl methacrylate), or an amino group (e.g., diethyl aminoethyl acrylate, diethyl aminoethyl methacrylate, or aminoethylvinyl ether); and a monomer unit derived from acrylonitrile, styrene, α-methylstyrene, alkyl vinyl ether, vinyl chloride, vinyl acetate, vinyl propionate, or ethylene.

From a point of view of ease of handling, it is preferable that the copolymer have a number-average molecular weight of 500 to 100,000.

Examples of the reactive silicon group of the copolymer include a group represented by general formula (7):

(7)

where $R^8$ and $R^9$ are each independently a C1-C20 substituted or unsubstituted monovalent organic group or a triorganosiloxy group; X's are hydroxyl groups or different or identical hydrolyzable groups; c is an integer of 0 to 2, d is an integer of 0 to 3, q is an integer of 0 to 19; and (sum of c's)+d≧1 is satisfied.

From a point of view of economical efficiency and availability, a preferred example of reactive silicon groups represented by general formula (7) is a group represented by general formula (8):

(8)

where $R^9$, X, and d are the same as above.

From a point of view of sufficient curability, it is preferable that the average number of reactive silicon groups of the copolymer be not less than 1 per molecule, more preferably not less than 1.1 per molecule, or especially preferably not less than 1.5 per molecule.

Specific examples of the hydrolyzable groups in general formula (7) include a halogen atom, a hydrogen atom, an alkoxy group, an acyloxy group, a ketoxymate group, an amino group, an amide group, an acid amide group, an aminooxy group, a mercapto group, and an alkenyloxy group.

Specific examples of $R^8$ and $R^9$ in general formula (7) include an alkyl group such as a methyl group or an ethyl group, a cycloalkyl group such as a cyclohexyl group, an aryl group such as a phenyl group, and an aralkyl group such as a benzyl group. Furthermore, $R^8$ and $R^9$ may each be a triorganosiloxy group represented by $R^4{}_3SiO-$ (where $R^4$ is the same as above). Among these, a methyl group is preferred in particular.

Further examples of the method for producing an organic polymer with which a vinyl-based polymer having a reactive silicon group has been blended include a method for polymerizing an acrylic ester monomer unit and/or a methacrylic ester monomer unit in the presence of a polyoxyalkylene-based polymer having a reactive silicon group. This production method is specifically disclosed in, but is not limited to: publications such as Japanese Unexamined Patent Application Publication No. 78223/1984 (Tokukaisho 59-78223), Japanese Unexamined Patent Application Publication No. 168014/1984 (Tokukaisho 59-168014), Japanese Unexamined Patent Application Publication No. 228516/1985 (Tokukaisho 60-228516), and Japanese Unexamined Patent Application Publication No. 228517/1985 (Tokukaisho 60-228517).

Examples of the filler, which serves as a component (B) of the present invention, include: reinforcing fillers such as fumed silica, precipitated silica, crystalline silica, molten silica, dolomite, silicic acid anhydride, hydrous silicic acid, and carbon black; fillers such as ground calcium carbonate, colloidal calcium carbonate, magnesium carbonate, diatom earth, calcined clay, clay, talc, titanium oxide, bentonite, organic bentonite, ferric oxide, micronized aluminum, flint powder, zinc oxide, active zinc oxide, Shirasu balloons, glass micro balloons, organic micro balloons such as those made of a phenol resin or a vinylidene chloride resin, metal balloons, and resin powder such as PVC powder and PMMA powder; and fibrous fillers such as asbestos, glass fiber, and filaments.

The particle size of the filler, which serves as the component (B), can be expressed in terms of average particle diameter. Normally, the average particle diameter is obtained through conversion from a specific surface area measurement (BET method, air-permeability method) or through conversion from a grain size distribution measurement (e.g., microtrack method).

From a point of view of availability and stability of properties, preferred examples of the filler (B1) having an average particle diameter of less than 0.5 μm include, but are not particularly limited to, colloidal calcium carbonate and fumed silica. From a point of balance of properties, colloidal calcium carbonate is preferred in particular.

The filler (B1) having an average particle diameter of less than 0.5 μm may be used in any amount. However, from a point of view of workability and balance of properties, it is preferable that the filler (B1) having an average particle diameter of less than 0.5 μm be used in an amount of not less than 25 to not more than 100 parts by weight with respect to 100 parts by weight of the organic polymer (A). Below 25 parts by weight, there is an increase in dripping. Above 100 parts by weight, there is deterioration in workability.

From a point of view of availability and stability of properties, preferred examples of the filler (B2) having an average particle diameter of not less than 0.5 μm to less than 10 μm include, but are not particularly limited to, light calcium carbonate, ground calcium carbonate, silica, clay, and talc. From a point of balance of properties, ground calcium carbonate is preferred in particular.

The filler (B2) having an average particle diameter of not less than 0.5 μm to less than 10 μm may be used in any amount. However, from a point of view of workability and balance of properties, it is preferable that the filler (B2) having an average particle diameter of not less than 0.5 μm to less than 10 μm be used in an amount of not less than 50 to not more than 200 parts by weight with respect to 100 parts by weight of the organic polymer (A). Below 50 parts by weight, there is a decrease in strength. Above 200 parts by weight, there is deterioration in workability.

From a point of view of availability and stability of properties, preferred examples of the filler (B3) having an average particle diameter of not less than 10 μm include, but are not limited to, ground calcium carbonate, silica, clay, talc, Shirasu balloons, glass micro-balloons, organic micro-balloons such as those made of a phenol resin or a vinylidene chloride resin, and resin powder such as PVC powder or PMMA powder. From a point of balance of properties, ground calcium carbonate is preferred in particular.

The filler (B3) having an average particle diameter of not less than 10 μm may be used in any amount. However, from a point of view of workability and balance of properties, it is preferable that the filler (B3) having an average particle diameter of not less than 10 μm be used in an amount of not less than 25 to not more than 150 parts by weight with respect to 100 parts by weight of the organic polymer (A). Below 25 parts by weight, there is a decrease in workability. Above 150 parts by weight, there is deterioration in strength.

To the curable resin composition of the present invention, an organic thixotropic agent (antidripping agent) may be added as needed to prevent dripping and improve workability. However, in general, an organic thixotropic agent cannot express its properties unless it is heated to a temperature not less than its melting point, and varies in thixotropic properties depending on how it is cooled. Therefore, in cases where it is possible to obtain satisfactory workability without an organic thixotropic agent through the composition of the filler (B), it is not necessary to use an organic thixotropic agent.

Examples of an organic thixotropic agent (antidripping agent) added, if any, to the curable resin composition of the present invention include, but are not particularly limited to: polyamide wax; hydrogenerated castor oil derivatives; and metal soaps such as calcium stearate, aluminum stearate, and barium stearate. These organic thixotropic agents (antidripping agents) may be used alone or in combination of two or more.

It is not necessary, but is preferable, to use a curing catalyst in curing the curable resin composition of the present invention. A curing catalyst to be used, if any, can be selected from a wide range of publicly-known curing catalysts, specific examples of which include silanol condensation catalysts such as: titanium compounds such as tetrabutyl titanate, tetrapropyl titanate, and titanium tetraacetylacetonate; tetravalent tin compounds such as dibutyltin dilaurate, dibutyltin maleate, dibutyltin phthalate, dibutyltin dioctanoate, dibutyltin diethyl hexanoate, dibutyltin dimethyl maleate, dibutyltin diethyl maleate, dibutyltin dibutyl maleate, dibutyltin dioctyl maleate, dibutyltin ditridecyl maleate, dibutyltin dibenzyl maleate, dibutyltin diacetate, dioctyltin diethyl maleate, dioctyltin dioctyl maleate, dibutyltin dimethoxide, dibutyltin dinonyl phenoxide, dibutenyltin oxide, dibutyltin diacetyl acetonate, dibutyltin diethyl acetoacetate, and products of reactions of dibutyltin oxides with phthalic esters; bivalent tin compounds such as tin octanoate, tin naphthenate, and tin stearate; organic aluminum compounds such as aluminum tris(acetyl acetonate), aluminum tris(ethyl acetoacetate), and diisopropoxy aluminum ethyl acetoacetate; zirconium compounds such as zirconium tetraacetyl acetonate; lead octylate; amine-based compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo(5,4,0)undecene-7 (DBU), or salts of these amine compounds with carboxylic acids; low-molecular-weight polyamide resins obtainable from an excess of polyamines with polybasic acids; products of reactions of an excess of polyamines with epoxy compounds; and an amino group-containing silane coupling agents such as γ-aminopropyltrimethoxysilane and N-(β-aminoethyl)-γ-aminopropylmethyldimethoxysilane. Further specific examples include other publicly-known silanol condensation catalysts such as acid catalysts and basic catalysts. These catalysts may be used alone or in a combination of two or more.

It is preferable that these curing catalysts be used in an amount of 0.1 to 20 parts by weight, or especially preferable 1 to 10 parts by weight, with respect to 100 parts by weight of the organic polymer (A) having at least one reactive silicon group per molecule. If the amount of the curing catalysts that are used is too small, there are undesirably a decrease in curing speed and insufficient progress in curing reaction. On the other hand, if the amount of the curing catalysts that are used is too large, there undesirably occur local heating and blistering at the time of curing. This makes it difficult to obtain a satisfactory cured product.

To the curable resin composition of the present invention, a silanol group-free silicon compound represented by general formula $R_eSi(OR)_{4-e}$ (where R's are each independently a C1-C20 substituted or unsubstituted hydrocarbon group and e is an integer of 0 to 3) may be added to further enhance the activity of the condensation catalysts.

The silicon compound is not particularly limited. However, phenyltrimethoxysilane, phenylmethyldimethoxysilane, phenyldimethylmethoxysilane, diphenyldimethoxysilane, diphenyldiethoxysilane, or triphenylmethoxysilane each represented by general formula $R_eSi(OR)_{4-e}$ where R's are each independently a C6-C20 aryl group is preferred because of its great effect of accelerating a curing reaction of the composition. Among them, diphenyldimethoxysilane or diphenyldiethoxysilane is preferred in particular because of its inexpensiveness and ready availability. It is preferable that the silicon compound be blended in an amount of 0.01 to 20 parts by weight, or especially preferable 0.1 to 10 parts by weight, with respect to 100 parts by weight of the organic polymer (A) having at least one reactive silicon group per molecule. If the amount of the silicon compound that is blended falls short of this range, there may be a decrease in effect of accelerating a curing reaction. On the other hand, if the amount of the silicon compound that is blended exceeds this range, there may be a decrease in hardness and tensile strength of the composition.

To the curable resin composition of the present invention, a plasticizer component may be added for the purpose of adjusting the properties of the curable resin composition, controlling the nature of the curable resin composition, and the like. Examples of a plasticizer include, but are not particularly limited to: phthalic esters such as dibutyl phthalate, diheptyl phthalate, di(2-ethyhexyl)phthalate, and butylbenzyl phthalate; nonaromatic dibasic esters such as dioctyl adipate, dioctyl sebacate, dibutyl sebacate, and isodecyl succinate; aliphatic esters such as butyl oleate and methyl acetyl ricinolate; polyalkylene glycol esters such as diethylene glycol dibenzoate, triethylene glycol dibenzoate, and pentaerythritol ester; phosphoric esters such as tricresyl phosphate and tributyl phosphate; trimellitic acid esters; chlorinated paraffins, hydrocarbon-based oil such as alkyl diphenyl and partially hydrogenerated terphenyl; process oils; polyethers such as polyethylene glycol and polypropylene glycol; epoxy plasticizers such as epoxidized soybean oil and epoxy benzyl stearate; acrylic polymers; polyester-based plasticizers; and ester alkylsulfonate. These plasticizers can be used alone or in combination of two or more; however, these plasticizers are not necessarily required. It should be noted that these plasticizers can be blended at the time of polymer production. In particular, polyethers and acrylic polymers are preferred. It is preferable that a polymer based on a SGO process, i.e., a polymer obtained through continuous bulk polymerization of an acrylic ester-based monomer at high temperatures and pressures be used as a plasticizer which is a low-molecular-weight alkyl acrylate ester polymer.

To the curable resin composition of the present invention, a silane coupling agent, a reaction product of a silane coupling agent, or a compound other than a silane coupling agent can be added as an adhesion-imparting agent. Specific examples of the silane coupling agent includes isocyanate group-containing silanes such as γ-isocyanate propyltrimethoxysilane, γ-isocyanate propyltriethoxysilane, γ-isocyanate propylmethyldiethoxysilane, and γ-isocyanate propylmethyldimethoxysilane; amino group-containing silanes such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, γ-ureidepropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenylbis(2-methoxyethoxy)silane, and N-(carboxymethyl)-β-aminoethyl-γ-aminopropyltrimethoxys ilane; vinyl-type unsaturated group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; and isocyanurate silanes such as tris(trimethoxysilyl) isocyanurate. Further usable examples of the silane coupling agent include amino-modified silyl polymers, silylated amino group-containing polymers, unsaturated aminosilane complexes, phenylamino(long-chain)alkylsilanes, aminosilylated silicones, and silylated polyesters, which are derivatives obtained by modifying the above silanes. In the present invention, the silane coupling agent is usually used within a range of 0.1 to 20 parts by weight, or especially preferably 0.5 to 10 parts by weight, with respect to 100 parts by weight of the polyoxypropylene (A) having a reactive silicon group.

A silane coupling agent added, if any, to the curable resin composition of the present invention exhibits a remarkable adhesion-improving effect under non-primer conditions or primer-treated conditions in cases where the curable resin composition used for various adherends, i.e., inorganic adherends such as those respectively made of glass, aluminum, stainless steel, zinc, copper, and mortar; and organic adherends such as those respectively made of vinyl chloride, an acrylic compound, polyester, polyethylene, and polypropylene, polycarbonate. The effect of improving the adhesion to various adherends is remarkable especially in the case of use under non-primer conditions. Specific examples of the compound other than a silane coupling agent include, but are not particularly limited to: an epoxy resin, a phenol resin, sulfur, alkyl titanates, and aromatic polyisocyanate. The above adhesion-imparting agents may be used alone or in combination of two or more. The addition of these adhesion-imparting agents makes it possible to improve adhesion to adherends.

If necessary, a physical property adjustor may be added to the curable resin composition of the present invention for the purpose of adjusting the tensile properties of the resulting cured product. Examples of the physical property adjustor include, but are not particularly limited to: alkylalkoxysilanes such as methyltrimethoxysilane, dimethyldimethoxysilane, trimethylmethoxysilane, and n-propyltrimethoxysilane; functional group-containing alkoxysilanes such as dimethyldiisopropenoxysilane, methyltriisopropenoxysilane, alkylisopropenoxysilane such as γ-glycycloxypropylmethyldiisopropenoxysilane, γ-glycycloxypropylmethyldimethoxysilane, γ-glycycloxypropyltrimethoxysilane, vinyltrimethoxysilane, vinyldimethylmethoxysilane, γ-aminopropyltrimethoxysilane, N-(β-aminoethyl)-γ-aminopropylmethyldimethoxysilane, γ-mercaptopropyltrimethoxysilane, and γ-mercaptopropylmethyldimethoxysilane; silicone varnishes; and polysiloxanes. The use of the above physical property adjustors makes it possible to increase the hardness of the curable resin composition of the present invention when the curable resin composition is cured, or to effect breaking elongation by reducing the hardness on the contrary. The above physical property adjustors may be used alone or in combination of two or more.

In particular, a compound that is hydrolyzed to generate a compound having a monovalent silanol group in the molecule has an effect of causing a reduction in modulus. An example of the compound that is hydrolyzed to generate a compound having a monovalent silanol group in the molecule is a compound described in Japanese Unexamined Patent Application Publication No. 117521/1993 (Tokukaihei 5-117521). Another example is a compound, described in Japanese Unexamined Patent Application Publication No. 241029/1999 (Tokukaihei 11-241029) and derived from a polyvalent alcohol having three or more hydroxyl groups, which generates a silicon compound that is hydrolyzed to generate trialkylsilanol such as trimethylsilanol. Examples of the polyvalent alcohol having three or more hydroxyl groups include trimethylolpropane, glycerin, pentaerythritol, and sorbitol.

A further example is a compound, described in Japanese Unexamined Patent Application Publication No. 258534/1995 (Tokukaihei 7-258534) and derived from an oxypropylene-based polymer, which generates a silicon compound that is hydrolyzed to generate trialkylsilanol such as trimethylsilanol. A still further usable example is a polymer, described in Japanese Unexamined Patent Application Publication No. 279693/1994 (Tokukaihei 6-279693), which has a silicon-containing group. The polymer can be hydrolyzed with a crosslinkable, hydrolyzable silicon-containing group to form a monosilanol-containing compound.

If necessary, various additives may be added to the curable resin composition of the invention for the purpose of adjusting various physical properties of the curable resin composition or the cured product. Examples of the additives include a flame retardant, a curability adjustor, an antioxidant, a radical inhibitor, an ultraviolet absorber, a metal inactivating agent, an antiozonant, a light stabilizer, a phosphoric peroxide decomposer, a lubricant, a pigment, a foaming agent, a solvent, a light-cured resin such as a polyfunctional acrylic resin, an oxygen-cured compound such as drying oil (e.g., castor oil and flaxseed oil), and a fungicide. These various additives may be used alone or in combination of two or more. Specific examples of such additives are described publications such as Japanese Examined Patent Publication No. 69659/1992 (Tokukohei 4-69659), Japanese Examined Patent Publication No. 108928/1995 (Tokukohei 7-108928), Japanese Unexamined Patent Publication No. 254149/1988 (Tokukaisho 63-254149), Japanese Unexamined Patent Publication No. 22904/1989 (Tokukaisho 64-22904), and Japanese Unexamined Patent Publication No. 72854/2001 (Tokukai 2001-72854).

The curable resin composition of the invention can be prepared in one-component form in which all blending components are blended, sealed in, and stored in advance, and then cured by moisture in the air after being actually used. Alternatively, the composition can be prepared in two-component form in which a blend of compounds such as a curing agent, a filler, a plasticizer, water is separately prepared in advance as a curing agent and the blended material is mixed with a polymer composition before use.

In cases where the curable resin composition is in one-component form, all of the blending components are blended in advance; therefore, it is preferable to use the water-containing blended component after dehydrating and drying it in advance, or to dehydrate it, for example, under reduced pressure during blending and kneading. In cases where the curable resin composition is in two-component form, it is unnecessary to blend a curing catalyst with a base resin containing the polymer having a reactive silicon group; therefore, there is little fear of gelatinization even if the blended material contains a certain amount of water. However, in cases where long-term storage stability is required, it is preferable that the blended agent be dehydrated and dried. In cases where the blended agent is in solid form such as powder form, a preferred example of a method for dehydration and drying is a method for drying by heating. In cases where the blended agent is in liquid form, a preferred example of a method for dehydration and drying is a method for dehydration under reduced pressure or a method for dehydration with use of synthetic zeolite, active alumina, silica gel, or the like. Further, it is possible to perform dehydration through a reaction between an isocyanate group and water with a small amount of an isocyanate compound. The storage stability can be further improved by adding the use of a lower alcohol or an alkoxysilane compound to the method for dehydration and drying. Examples of the lower alcohol include methanol and ethanol. Examples of the alkoxysilane compound include n-propyltrimethoxysilane, vinyltrimethoxysialne, vinylmethyldimethoxysilane, γ-mercaptopropylmethyldimethoxysilane, γ-mercaptopropylmethyldiethoxysilane, and γ-glycycloxypropyltrimethoxysilane.

The workability of the curable resin composition of the present invention can be evaluated by whether or not the curable resin composition drips when scooped up in moderate quantities with a trowel for use in applying floor adhesives (dripping of the curable resin composition) and whether or not the curable resin composition can be easily applied to a floor with a trowel (applicability). The curable resin composition of the present invention can be easily applied to floor materials without the resin's dripping when scooped up in moderate quantities with a trowel.

In general, the viscosity of a curable resin composition that exhibits such a satisfactory level of workability takes on a high value at a low speed of rotation and a low value at a high speed of rotation. The curable resin composition of the present invention exhibits satisfactory workability in cases where the viscosity thereof is 1000 Pa·s at a low speed (0.1 rev/sec) and 100 Pa·s at a high speed (10 rev/sec) when measured with use of an AR2000 Viscometer manufactured by TA Instruments (flat plate 2 cm, sample thickness of 1 mm).

The curable resin composition of the present invention is useful as adhesives or, in particular, as an adhesive to be applied with a trowel for floor materials, tiles, panels, and other members. Among them, the curable resin composition of the present invention is perfect for wooden floors, flooring materials, and the like that require solvent-free properties and adhesion to elastic materials.

Further, the curable resin composition of the present invention can serve as elastic sealants for use as sealing materials and adhesives for buildings, ships, automobiles, roads, and the like. Furthermore, the curable resin composition of the present invention can adhere to a wide range of substrates such as glass, ceramic, wood, metal, resin molded products by itself or with help from a primer, and therefore can be used as sealing compositions for various applications. The curable resin composition of the present invention can be used as contact adhesives as well as normal adhesives. Furthermore, the curable resin composition of the present invention is useful as food packaging materials, cast rubber materials, molding materials, and paint.

EXAMPLES

The present invention will be described by way of Examples; however, the present invention is not limited to these examples.

Examples 1 to 6 and Comparative Examples 1 to 3

Curable resin compositions shown in Table 1 were each prepared by using an MS polymer S303H or SAX350 (manufactured by KANEKA BELGIUM N.V.; polyoxypropylene-based polymer having a methyldimethoxysilyl group) as a component (A), by using Calfort S (manufactured by Speciality Minerals; stearate-treated colloidal calcium carbonate having an average particle diameter of 0.07 μm) as a component (B1), by using Carbital 110S (manufactured by Imerys; stearate-treated ground calcium carbonate having an average particle diameter of approximately 2 μm) or OMYA BLH (manufactured by OMYA; surface-treated ground calcium carbonate having an average particle diameter of 5.5 μm) as a component (B2), and by using Durcal 40 (manufactured by OMYA; untreated ground calcium carbonate having an average particle diameter of 30 μm) and/or Durcal 65 (manufactured by OMYA; untreated ground calcium carbonate having an average particle diameter of 45 μm).

The workability of each of the curable resin compositions was evaluated by whether or not the resin drips when scooped up in moderate quantities with a trowel (dripping of the curable resin composition) and whether or not the curable resin composition was easily applied to a floor material with a trowel (applicability).

The viscosity of each of the curable resin compositions was measured at a low speed of rotation (0.1 rev/sec) and a high speed of rotation (10 rev/sec) with use of an AR2000 Viscometer manufactured by TA Instruments (flat plate 2 cm, sample thickness of 1 mm).

The hardness and dumbbell properties of each of the curable resin compositions were measured after it had been cured at 23° C. for seven days.

Table 1 shows results of measurement of the workability, viscosity, hardness, and dumbbell properties of (DIN 18540, sample thickness of 3 mm, tensile speed of 200 mm/min) of each of the curable resin compositions.

TABLE 1

|  |  |  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|---|
| Component A | S303H | MS polymer manufactured by KANEKA BELGIUM | 100 | 100 |  |  |  | 100 | 100 | 100 | 100 |
|  | SAX350 | MS polymer manufactured by KANEKA BELGIUM |  |  | 100 | 100 | 100 |  |  |  |  |
| Component B1 | Calfort S | Manufactured by Speciality Minerals Stearate-treated colloidal calcium carbonate Average particle diameter of 0.07 μm | 70 | 70 | 70 | 70 | 70 | 50 | 110 | 110 |  |
| Component B2 | Carbital 110S | Manufactured by Imerys Stearate-treated ground calcium carbonate Average particle diameter of approximately 2 μm |  | 120 | 100 |  | 120 | 150 |  |  | 200 |
|  | Omya BLH | Manufactured by OMYA Surface-treated ground calcium carbonate Average particle diameter of 5.5 μm | 120 |  |  | 120 |  |  | 150 |  |  |
| Component B3 | Durcal 40 | Manufactured by OMYA Untreated ground calcium carbonate Average particle diameter of 30 μm | 30 | 30 | 80 | 30 | 30 | 100 |  | 150 | 100 |
|  | Durcal 65 | Manufactured by OMYA Untreated ground calcium carbonate Average particle diameter of 45 μm | 30 | 30 |  | 30 | 30 |  |  |  |  |
|  | Mesamol II | Plasticizer manufactured by Bayer (Lanxess) | 60 | 60 | 60 | 60 | 60 | 50 | 50 | 50 | 50 |
|  | VTMO | Silane coupling agent manufactured by Degussa | 2 | 2 | 2 | 2 | 2 | 2 | 2 | 2 | 2 |
|  | DAMO | Silane coupling agent manufactured by Degussa | 3 | 3 | 3 | 3 | 3 | 3 | 3 | 3 | 3 |
|  | U220H | Tin-based curing catalyst manufactured by Nitto Kasei Co., Ltd. | 1 | 1 | 1 | 1 | 1 | 1 | 1 | 1 | 1 |
| Workability | Dripping of resin composition |  | None | None | None | None | None | None | None | None | Dripped |
|  | Applicability |  | Good | Good | Good | Good | Good | Good | Poor | Poor | Good |
| Viscosity | Speed (0.1 rev/sec) | Pa·s | 1651 | 1989 | 2339 | 1483 | 1878 | 2686 | 9427 | 7475 | 633 |
|  | Speed (10 rev/sec) | Pa·s | 55 | 65 | 50 | 45 | 48 | 88 | 143 | 140 | 52 |
| Hardness | Shore A |  | 41 | 41 | 43 | 42 | 43 | 49 | 46 | 49 | 46 |
| Dumbbell properties | 50% modulus | MPa | 0.53 | 0.56 | 0.61 | 0.57 | 0.62 | 0.79 | 0.71 | 0.75 | 0.67 |
|  | Breaking strength | MPa | 0.97 | 1.09 | 1.12 | 0.97 | 1.1 | 1.13 | 1.37 | 1.17 | 0.92 |
|  | Breaking elongation | % | 311 | 311 | 293 | 293 | 279 | 222 | 437 | 300 | 128 |

Examples 1 to 6 exhibited satisfactory workability to serve as floor adhesives. On the other hand, Comparative Examples 1 and 2 were high in viscosity at a high speed and poor in applicability, and Comparative Example 3 was low in viscosity at a low speed and poor in workability because it dripped when scooped up with a trowel. It should be noted that each of Examples 1 to 6 and Comparative Examples 1 to 3 exhibited satisfactory hardness and dumbbell properties to serve as a floor adhesive.

The invention claimed is:

1. A curable resin composition comprising:
   an organic polymer (A) having at least one reactive silicon group per molecule;
   wherein a polymer main chain of the organic polymer (A) is a polyoxypropylene-based polymer;
   a filler (B) simultaneously containing a filler (B1) having an average particle diameter of less than 0.5 μm, a filler (B2) having an average particle diameter of not less than 0.5 μm to less than 10 μm, and a filler (B3) having an average particle diameter of not less than 10 μm;
   wherein the fillers (B1), (B2), and (B3) constituting the filler (B) are contained in amounts of not less than 25 to not more than 100 parts by weight, not less than 50 to not more than 200 parts by weight, and not less than 25 to not more than 150 parts by weight, with respect to 100 parts by weight of the organic polymer (A), respectively;
   wherein the filler (B) is calcium carbonate; and
   the curable resin composition contains no organic thixotropic agent.

2. The curable resin composition as set forth in claim 1, having a viscosity of not less than 1000 Pa.s at a speed of rotation of 0.1 rev/sec and a viscosity of not more than 100 Pa.s at a speed of rotation of 10 rev/sec.

3. The curable resin composition as set forth in claim 1, being used as a wooden-floor adhesive.

* * * * *